June 17, 1924.          M. WIELAND          1,497,747
METHOD OF MAKING PHOTOGRAPHIC COLOR SCREENS
Filed Oct. 27, 1919
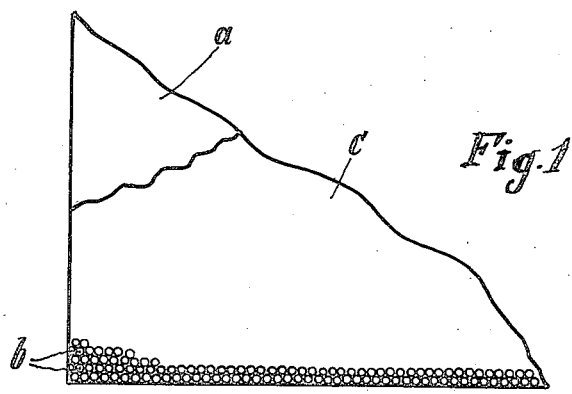
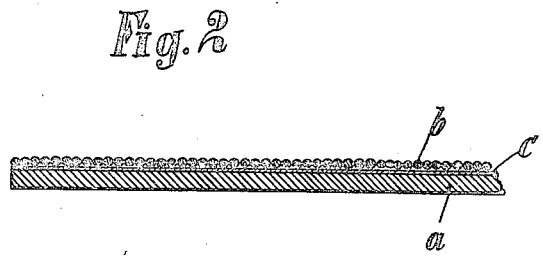
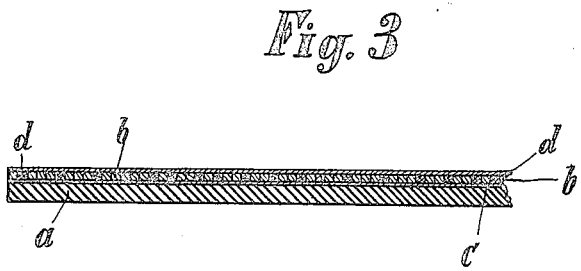
Inventor.
Max Wieland,
By B. Singer,
Atty Patented June 17, 1924.

1,497,747

UNITED STATES PATENT OFFICE.

MAX WIELAND, OF BERLIN-TEMPELHOF, GERMANY.

METHOD OF MAKING PHOTOGRAPHIC COLOR SCREENS.

Application filed October 27, 1919. Serial No. 333,754.

*To all whom it may concern:*

Be it known that I, MAX WIELAND, a citizen of Germany, and residing at Berlin-Tempelhof, Bosestrasse 47, Germany, have invented certain new and useful Improvements in Methods of Making Photographic Color Screens, of which the following is a specification.

This invention relates to a new method for making screen plates for the photography in natural colors, color particles which are used, being products of phenol and formaldehyde, mixed with suitable condensation products, tinted in the necessary colors. They are in some soluble intermediary condition ground to fine powder or balls and after having been applied to the screen plate they are hardened by heat and if necessary by pressure. This color screen may then be coated with a colorless layer of the same products of condensation.

While in the known plates for photography in natural colors, starch, colloidal material, resins or the like, were used and while these coverings are liable to attack by high temperature, the product which is used in the present case does not melt and will burn only at a heat of 300 degrees C. Photographic plates in natural colors are frequently used for projection purposes and in that case it is important to have them as heat-proof as possible. This therefore constitutes a great advantage over the known plates.

The material also will resist mechanical attacks. It is not attacked by alkaline or acid solutions.

The plates for taking pictures in natural colors as used up to the present time, absorb a considerable portion of the light and it is therefore impossible or very difficult and then only under the best conditions, to take snap-shots. The product of the present invention has a co-efficient of refraction which is not attained at all by the present products. There is thus minimum absorption of light in the present case, and it is therefore feasible to use the plates for short instantaneous exposures.

In the accompanying drawings:—

Fig. 1 is a diagrammatic plan of a screen plate as prepared in accordance with my invention.

Figs. 2 and 3 are sections of the same.

In the drawings, *a* indicates the plate; *b* the small screen particles dusted onto the plate utilizing for this purpose a layer *c* of a condensation product which is adhesive. In Fig. 3 the spherical screen particles *b* have become viscous by heat and pressure. They have expanded and are now in close contact with each other. The whole structure is then coated with a layer of a condensation product.

The size of the particles is for purposes of illustration shown exaggerated in the drawings.

The method is carried out as follows:—

Phenol is mixed with formaldehyde and some suitable condensation products, tinted in some way with the various colors required and condensed until they become toughly viscous. In the preparation of such products there are employed three liquids which have different colors. Each liquid is atomized in itself by means of a centrifugal device. Owing to this atomization the alcohol evaporates and the dye product is deposited in powdered and dried condition. These three dried dye products are then mixed together. This intermediary product is then combined with some suitable means for diluting it, as for instance methyl alcohol, and while it is much more fluid than after the first condensation, it is atomized by centrifugal forces in a suitably constructed heated condensation space and owing to this atomization, it is decomposed into particles.

The temperature of the condensating space and precipitating space is selected so that the small particles become solid in the shape of small spheres, but a powdery product is obtained which is still soft at ordinary temperature, and which, when heated, becomes still softer, elastic and tough-fluid. By varying the number of revolutions during the centrifugating, the size of the particles may also be varied and at the same time the particles are separated because smaller particles are thrown farther away from the center than the larger particles.

The powder produced in this way containing the different colors, is thoroughly mixed in the proportions required and is then applied to the emulsion carrier, a glass plate, celluloid film or the like by dusting it on to this carrier coated with a thin layer of a suitable adhesive, such as for instance an artificial resin, i. e., a product made of formaldehyde and phenol. This product, according to experience, withstands temperatures of several hundred degrees C. without decomposition and it increases in solidness the longer the higher temperatures act thereon. The carrier of the emulsion covered in this way with the screen particles is then heated, the small particles again become softer, somewhat viscous, so that they lie in close contact with each other and this operation of heating or of applying heat and pressure is continued until they become non-fusible and non-soluble. From the foregoing it will be understood that in accordance with my invention the condensation products of different colors are mixed while dry and then produce naturally a product or a powder of uniform grayish black color.

This layer of color filter is then covered with a colorless liquid coating of the same product of condensation omitting the coloring and this layer is again condensed until it ceases to be fusible and soluble.

The product of condensation herein before referred to in itself is known. The manufacture of this product of condensation takes place in the following way:—To the starting products of condensation, namely, phenol and formaldehyde, a basis or even an acid is added prior to the condensation (any alkali or any acid may do), then the condensation is proceeded with and there is formed an artificial product of resin-like consistency, clear as water and either of a liquid or of a solid constitution. This solid product of condensation is dissolved by alcohol or the like, is then mixed with the pigment or dye and principally tar dyes are to be used. This liquefied and dyed product of condensation is then treated centrifugally or is atomized respectively, so as to produce a dry, uniform dust of a pigment of red, green or blue color, depending upon the kind or color of the dye which had been added to the mixture. It is obvious that the centrifugal treatment or atomization respectively for the three above named mixtures of pigments takes place separately but it takes place with the same space of condensation or even the same space for observing these products, so that the dustlike spherical particles of red, green and blue pigment are mixed automatically, and if the proportion in which they are mixed is selected properly then the appearance of the total mixture will be grey or black respectively.

I claim:—

1. The method of producing screen-plates for photography in colors, which consists in first mixing phenol with formaldehyde and suitable condensation products tinted one of the necessary different colors and condensed to a tough-fluidity, mixing this product with a suitable diluting means, centrifugating this mixture in a heated receptacle by varying the number of revolutions so as to obtain particles of different sizes and to separate the same from each other similarly making particles of the other necessary colors, mixing the particles of different colors thus obtained to produce a uniform mixture of differently colored particles, applying this mixture to the screen plate previously provided with a thin layer of an adhesive, exposing this screen-plate to the action of heat, and then coating said screen-plate with a layer of a colorless phenol condensation product.

2. The method of producing screen-plates for photography in colors which consists in first mixing phenol with formaldehyde and suitable condensation products tinted one of the necessary different colors and condensed to a tough-fluidity, mixing this product with a suitable diluting means, centrifugating this mixture in a heated receptacle at required speed of revolution to obtain particles of different sizes and to separate the same from each other, similarly making particles of the other necessary colors, mixing the particles of different colors thus obtained in the required proportions to produce a uniform mixture of differently colored particles, applying this mixture to the screen plate previously provided with a thin layer of an adhesive, exposing this screen-plate to the action of heat and pressure, and then coating said screen-plate with a layer of a colorless phenol condensation product.

In testimony whereof I affix my signature in presence of two witnesses.

MAX WIELAND.

Witnesses:
CARL HUP,
CH. METZNER.